April 6, 1954 R. V. RIGG 2,674,134
AIRCRAFT CONTROL ROD HINGE SEAL
Filed Sept. 2, 1952

Inventor
Robert V. Rigg
by Babcock & Babcock
attorneys

UNITED STATES PATENT OFFICE 2,674,134

AIRCRAFT CONTROL ROD HINGE SEAL

Robert Vincent Rigg, Warton, England, assignor to The English Electric Company Limited, London, England, a British company Application September 2, 1952, Serial No. 307,416

Claims priority, application Great Britain September 10, 1951

1 Claim. (Cl. 74—519)

The invention relates to control rod hinge seals for aircraft having pressurised cockpits, where leakage of air through the hinges is to be avoided as far as possible while allowing an easy movement of the controls under severe pressure difference and low temperature conditions.

According to the invention I provide a control rod hinge seal for aircraft having a pressurised cockpit, comprising in combination: a drum-shaped outer hinge member open at angularly offset sections of its circumference, a plurality of one piece drum-shaped hinge members fitted into said outer hinge member side by side coaxially with and rotatable independently of one another, and pairs of separate lever arms, one arm of each pair fitted to one of the said inner hinge members from the side of the pressurised cockpit, and the other arm of each pair from the side open to the outer space.

Figure 1:
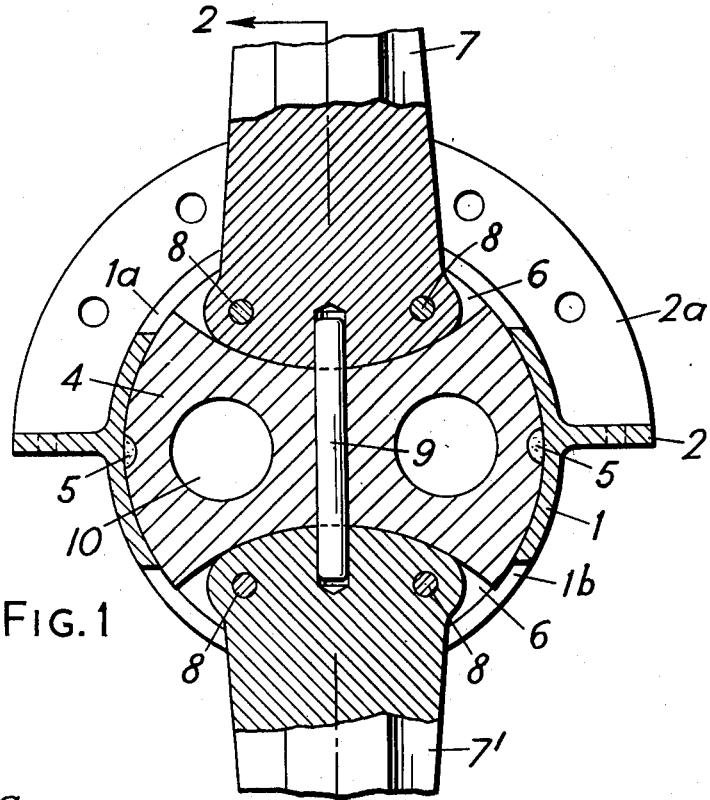
Figure 2:
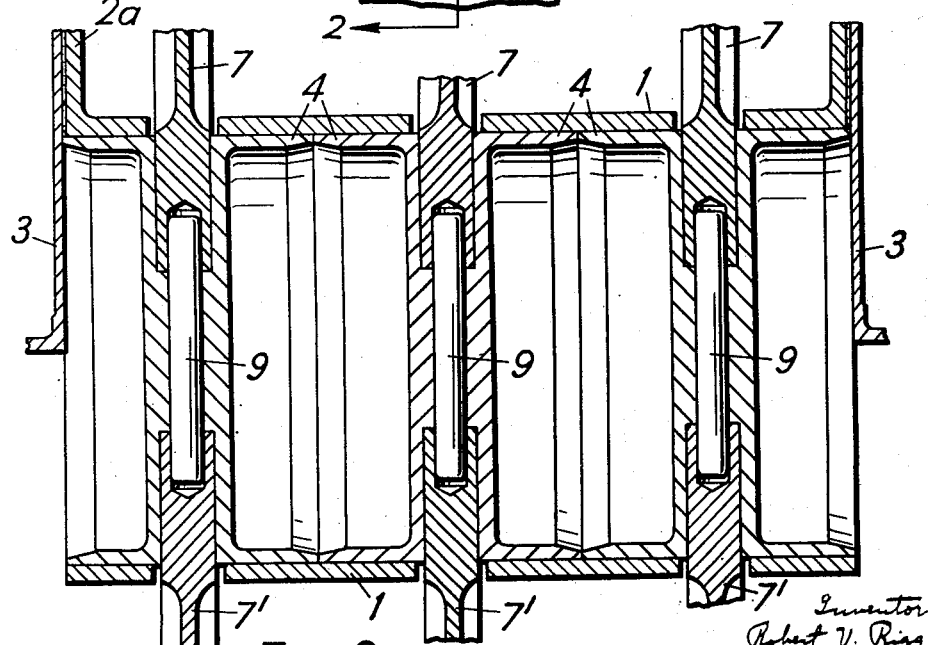

In order that the invention may be better understood and readily carried into effect, an embodiment thereof will now be described by way of example with reference to the accompanying drawing in which:

Fig. 1 is a section through the seal perpendicular to the axis of the hinge, and Fig. 2 shows a multi-lever seal arrangement in longitudinal section on the line 2—2 of Fig. 1.

The casing 1 is attached with its flanges 2 and 2a to a flange 3 of the bulkhead separating the pressurised cockpit of an aircraft from the outer atmosphere. This casing 1 is in the shape of a drum open along diametrically opposite sections 1a and 1b of its circumference, and at its ends. A plurality of inner drum members 4 fits internally into the casing 1 and is lubricated and sealed by two diametrically opposite longitudinal grooves 5 charged with non-freezing grease.

A pair of circular arc slots 6 is machined into each inner drum member 4 diametrically opposite one another and offset from the grooves 5, and pairs of lever arms 7, 7' are fitted into these slots, attached to their associated inner drum members 4 by means of two bolts 8 on each side, and positioned by a dowel pin 9 arranged diametrically through their associated inner drum members 4 and projecting into bores of the opposite lever arms 7, 7' of the associated pair. Lighting holes 10 may be provided in the inner drum members 4.

As will be seen from Fig. 2, the said plurality of joints is arranged in alignment in a common casing 1. For example, one pair of levers may be provided for the elevator controls, another for the rudder controls and a third for the aileron controls of the aircraft.

The path for any air leakage from the pressurised cockpit to the outer atmosphere past the grease lubricated cylindrical surfaces of the inner and outer drum members is narrow and comparatively long, and the grooves 5 provide a sort of labyrinth seal effect. Instead of being truly longitudinal and diametrically opposite, these grooves may be slightly helical or not diametrically opposite but otherwise angularly offset.

Tests have shown that the high sealing effect and low friction of the hinge according to the invention under conditions emulating high flying at low atmospheric pressure and temperature are most satisfactory.

While I have described and illustrated what may be considered a typical and particularly useful embodiment of my invention, I wish it to be understood that I do not limit myself to the particular details and dimensions described and illustrated, for obvious modifications will occur to a person skilled in the art.

What I claim as my invention and desire to secure by Letters Patent is:

A control rod hinge seal for aircraft having a pressurised cockpit, comprising in combination: a drum-shaped outer hinge member open at angularly offset sections of its circumference, a plurality of one piece drum-shaped hinge members fitted into said outer hinge member side by side coaxially with and rotatable independently of one another, and pairs of separate lever arms, one arm of each pair fitted to one of the said inner hinge members from the side of the pressurised cockpit, and the other arm of each pair from the side open to the outer space.

References Cited in the file of this patent

UNITED STATES PATENTS

| Number | Name | Date |
| --- | --- | --- |
| 1,025,884 | Schmitt | May 7, 1912 |
| 1,194,146 | Cummins | Aug. 8, 1916 |
| 2,381,391 | Brown | Aug. 7, 1945 |

FOREIGN PATENTS

| Number | Country | Date |
| --- | --- | --- |
| 715,919 | Germany | Jan. 9, 1942 |